United States Patent
Wendte

(10) Patent No.: US 7,302,837 B2
(45) Date of Patent: Dec. 4, 2007

(54) TIRE INFLATION SYSTEM FOR USE WITH AN AGRICULTURAL IMPLEMENT

(75) Inventor: Keith W. Wendte, Hinsdale, IL (US)

(73) Assignee: CNH America LLC, Racine, WI (US)

( * ) Notice: Subject to any disclaimer, the term of this patent is extended or adjusted under 35 U.S.C. 154(b) by 177 days.

(21) Appl. No.: 11/236,035

(22) Filed: Sep. 27, 2005

(65) Prior Publication Data

US 2007/0068238 A1 Mar. 29, 2007

(51) Int. Cl.
*B60C 23/02* (2006.01)

(52) U.S. Cl. ...................... 73/146.5; 340/442

(58) Field of Classification Search .................. 73/146, 73/146.5; 340/442, 443
See application file for complete search history.

(56) References Cited

U.S. PATENT DOCUMENTS

| | | |
|---|---|---|
| 4,978,941 A | 12/1990 | Brown |
| 5,180,456 A | 1/1993 | Schultz et al. |
| 5,263,524 A | 11/1993 | Boardman |
| 5,327,346 A | 7/1994 | Goodell |
| 5,429,167 A | 7/1995 | Jensen |
| 5,584,949 A | 12/1996 | Ingram |
| 5,647,927 A | 7/1997 | Mason |
| 5,839,801 A | 11/1998 | Ferguson |
| 5,995,895 A | 11/1999 | Watt et al. |
| 6,061,618 A | 5/2000 | Hale et al. |
| 6,098,682 A | 8/2000 | Kis |
| 6,144,295 A | 11/2000 | Adams et al. |
| 6,212,464 B1 | 4/2001 | Skotnikov |
| 6,236,923 B1 | 5/2001 | Corcoran et al. |
| 6,246,316 B1 | 6/2001 | Andsager |
| 6,594,566 B1 | 7/2003 | Skoff |
| 6,758,088 B2 | 7/2004 | Claussen et al. |
| 6,779,618 B2 | 8/2004 | Tatasinski |
| 2003/0050743 A1 | 3/2003 | Caretta et al. |

OTHER PUBLICATIONS

Tom C. Doran, Variable Tire Pressure Concept Used By Michelin, Sep. 7, 2005, AgriNews, 2 pages, www.agrinews-pubs.com.
Viacheslav I. Adamchuk, On-the-Go Vehicle-Based Soil Sensors, Precision Agriculture, University of Nebraska Cooperative Extension EC, 4 pages, not dated.

*Primary Examiner*—Andre J. Allen
(74) *Attorney, Agent, or Firm*—Rebecca Henkel

(57) ABSTRACT

A central tire inflation system for an agricultural implement that is linked to a work vehicle for movement in a field. The central tire inflation system includes a database of soil conditions corresponding to location, an implement load sensor, a location determiner, a processor, and tire inflation controller. The processor determines the proper inflation of implement tires based on factors including the soil conditions and implement load.

20 Claims, 4 Drawing Sheets

Key

☒ = 1.00 Dry  ▩ = .50 Dry

▨ = .75 Dry  ▧ = .25 Dry

TIRE INFLATION SYSTEM FOR USE WITH AN AGRICULTURAL IMPLEMENT

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to automatic tire inflation systems and more specifically to a method and apparatus for controlling the inflation of tires on an agricultural implement.

Soil is made up of soil particles, water, and air. The spaces between soil particles are called pore spaces. Soil compaction occurs when soil particles are forced closer together so that pore space is reduced. Soil structure impacts the ability of soil to absorb and conduct water, nutrients, and air necessary for plant root growth activity. It is important that the soil structure is not excessively compacted. Soil compaction impacts water infiltration, water drainage, the exchange of gases within soil and soil strength. Soil compaction can cause erosion and water runoff.

Soil compaction's effect on crop growth and yield depends on the type of crop as well as the environmental conditions. When conditions are dry, some soil compaction is good for crop growth but too much compaction tends to cause decreased root growth. When conditions are wet, any soil compaction usually decreases crop growth and yield. Additionally, when conditions are wet, soil compaction decreases soil aeration which results in de-nitrification. Soil compaction can also cause nitrogen and potassium deficiencies and may increase risk of crop disease.

Deep tilling is used to de-compact soil. For various reasons known in the art, it is often advantageous to minimize tillage. This extra operation requires the producer to spend more money for fuel and labor. In addition, deep tilling typically decreases surface residue which results in less protection of the soil against soil and wind erosion. Deep tillage also causes a rougher soil profile which in turn causes excessive implement frame bounce during movement through a field for subsequent field operations. Implement frame bounce negatively impacts bale quality in hay equipment and seed depth consistency and uniform seed spacing during the planting operation. In order to reduce tillage requirements it is important to minimize compaction as much as possible.

Agricultural vehicle traffic is one of the major causes of soil compaction. Agricultural work vehicles and implements have become larger and heavier in recent years. The increase in weight of the vehicles and implements has increased the level of soil compaction that occurs within fields which in turn has reduced crop growth and yield. To minimize compaction due to vehicle traffic, in some cases tracks have been added to vehicles so that the weight of the vehicles can be distributed over wider areas. Unfortunately tracks are relatively expensive when compared to tires and can slow down operation, two shortcomings that render tracks unsuitable for many applications.

Another solution to minimize vehicle compaction has been to increase tire size and, more specifically, to increase tire width to minimize the contact pressure that the tires exert on the soil. Compaction of properly inflated large (e.g., wide) tires is comparable to compaction associated with tracks.

One other way to reduce vehicle compaction is to adjust tire pressure as a function of load on the tires. To this end, to reduce compaction, tire pressure can be reduced by letting air out of a tire which causes vehicle weight to be distributed over a larger area (i.e., the area of the portion of the tire that contacts the ground below the vehicle. Tire inflation can also be regulated to control wheel slip and to increase overall ride smoothness. A typical tire inflation system includes a controller, a compressor and a valve where the controller controls the compressor to increase tire pressure when desired and controls the valve to decrease pressure.

In at least some cases tire inflation systems have been designed that control a prime mover vehicle's tire pressure based on a draft load on a drawbar or hitch, ballast weight of the vehicle, vehicle operating speed and tire speed. Here, typically, as tire load is increases, the controller controls the compressor to increase tire pressure.

While known central tire inflation systems minimize compaction caused by prime mover vehicles such as tractors, known systems fail to eliminate or minimize compaction caused by and bounce associated with implements that are pulled by prime movers.

BRIEF SUMMARY OF THE INVENTION

The present invention provides a tire inflation system for an agricultural implement or implements attached to a vehicle. The agricultural implement has a sensor that senses a characteristic of the load of the implement's load. The sensor generates an implement load signal. A processor receives the load signal and generates tire inflation control signals as a function of the load signal. The load signals are received by a tire inflation controller and the controller thereby regulates the pressure of the implement's tires. The control signals tend to decrease tire pressure as the load signal increases.

The implement tires that are mounted on an axle may have load sensors that are load cells or strain gauges on the axle and the like. The load sensor may also be a load cell supporting a product bin, a bale volume sensor, a bulk fill sensor, a sprayer level sensor, a down pressure sensor, and the like. The load sensor may be any combination of the aforementioned sensors.

The implement may have a component that engages the ground. The load on the implement tires may be increased or decreased when the component engages the ground.

The implement may have a carrying wheel coupled to a hydraulic cylinder. The load sensor may be hydraulic pressure sensor and the like that monitors the pressure of the hydraulic cylinder.

The implement may have a gauge wheel attached to a hydraulic cylinder. The load sensor may be hydraulic pressure sensor and the like that monitors the pressure of the hydraulic cylinder.

The tire inflation system may also have a soil characteristic determiner. The determiner may generate soil characteristic signals as the implement is moved through a field. The soil characteristic signals may indicate at least one soil condition of the soil that the implement is traveling on. The processor may generate tire inflation control signals as a function of at least the load signal and the soil characteristic signals.

The soil characteristic determiner may include a soil moisture sensor, a soil bulk density sensor, a compaction layer sensor, a soil conductivity sensor, a soil profile sensor, an inclinometer, and the like.

The tire inflation system may also include a database and location determiner. The location determiner may include a GPS receiver.

The database may store condition characteristics corresponding to the field where the implement is to be used. The condition characteristics may correlate at least one condition with field locations. The location determiner may determine the location of the implement within the field. The processor may use the implement location and the database to identify the soil characteristics proximate the implement.

The database may be predefined and pre-stored with soil condition characteristics corresponding to locations within a field in which the implement is to be used. The database may indicate at least two different soil conditions corresponding to many different locations with in the field.

The tire inflation system may also regulate the tire pressure of the tires of the vehicle to which the implement is attached. The system may include a vehicle load determiner for identifying at least one vehicle load characteristic. The vehicle load determiner may generate a vehicle load signal. The processor may receive the vehicle load signal and may generate vehicle tire inflation control signals as a function of the vehicle load signal.

The vehicle tire inflation control signals may tend to increase or decrease the tire pressure as the magnitude of the vehicle load increases or decreases.

The processor of the system that controls the inflation of the implement tires and the vehicle tires may be supported by the vehicle.

DETAILED DESCRIPTION OF THE PREFERRED EMBODIMENTS

Figure 1:
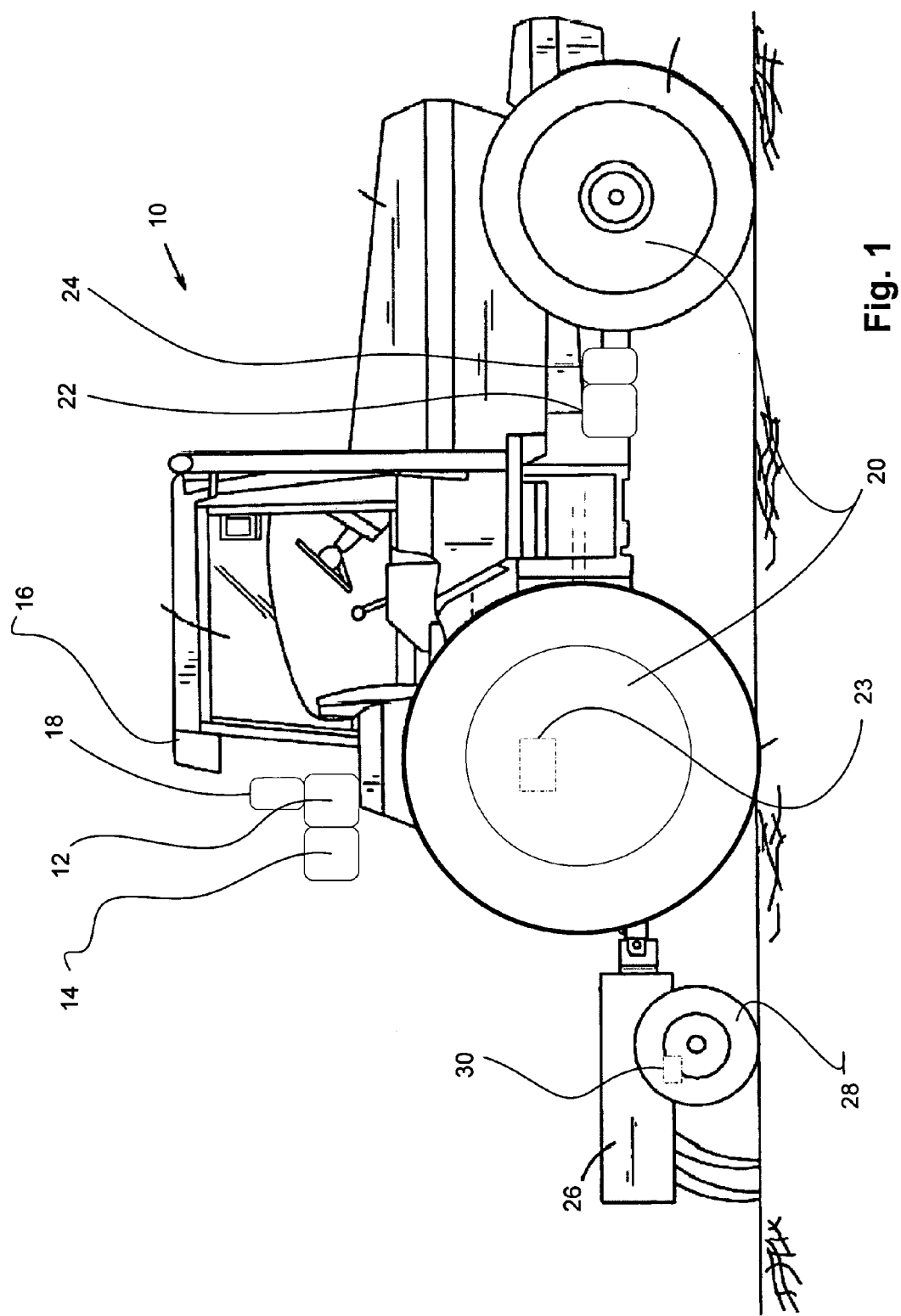
FIG. 1 is a side view of an agricultural work vehicle pulling an agricultural implement.

One or more specific embodiments of the present invention will be described below. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

It has been recognized that tire pressure of tires associated with certain agricultural implements should be controlled in a fashion that is different than the fashion in which typical tire inflation systems control tire pressure. To this end, while most tire inflation systems increase tire pressure as load is increased, in cases where an implement includes ground engaging components such as C-shaped shanks, the shanks are known to be "sucked" down into soil when pulled therefore increasing the load on implement tires and hence the load. At least some embodiments of the present invention reduce tire pressure to avoid cases where the tire stops rotating and begins to bull doze through soil there below. Here, when the load exceeds a threshold value, the tires actually can begin to bulldoze through the soil. Here, dozing activity is avoided by reducing tire pressure so that more area of a tire is in contact with ground there below.

Some embodiments take advantage of both real time tire load information and pre-known and stored field soil characteristics to identify and set optimal tire pressure. To this end, in many cases optimal tire pressure is related to both current tire load as well as field conditions. Field conditions can generally be known prior to activity within a field while, in the case of many agricultural implements, tire load cannot be known prior to operation within a field as the tire load often changes. At least some embodiments of the present invention use both information that can be pre-known about the field and real time changing information about tire load to control tire pressure.

Referring now to the figures wherein like reference numerals correspond to similar elements throughout the several views and, more specifically, referring to FIG. 1 the present invention will be described in the context of a self-propelled agricultural work vehicle 10 pulling an agricultural implement 26. Work vehicle or prime mover 10 includes, among other components, a processor 12, a tire inflation controller 14, a location sensor 16, a geographical information system (GIS) database 18, tires 20, a soil characteristic sensor 22, a vehicle load sensor 23 and a speed sensor 24. Implement 26 has tire(s) 28 and an agricultural implement load characteristic sensor(s) 30.

As shown in FIG. 1, processor 12 is coupled to work vehicle 10. An existing processor coupled to the work vehicle and provided for other purposes can operate as a processor for the central tire inflation system or a separate processor may be used. Where a separate processor is provided, the separate processor may be mounted to either work vehicle 10 or implement 26. Likewise, inflation controller 14, location sensor 16, database 18, soil characteristic sensor 22, and/or the speed sensor 24 may be mounted to either work vehicle 10 or implement 26.

Figure 2:
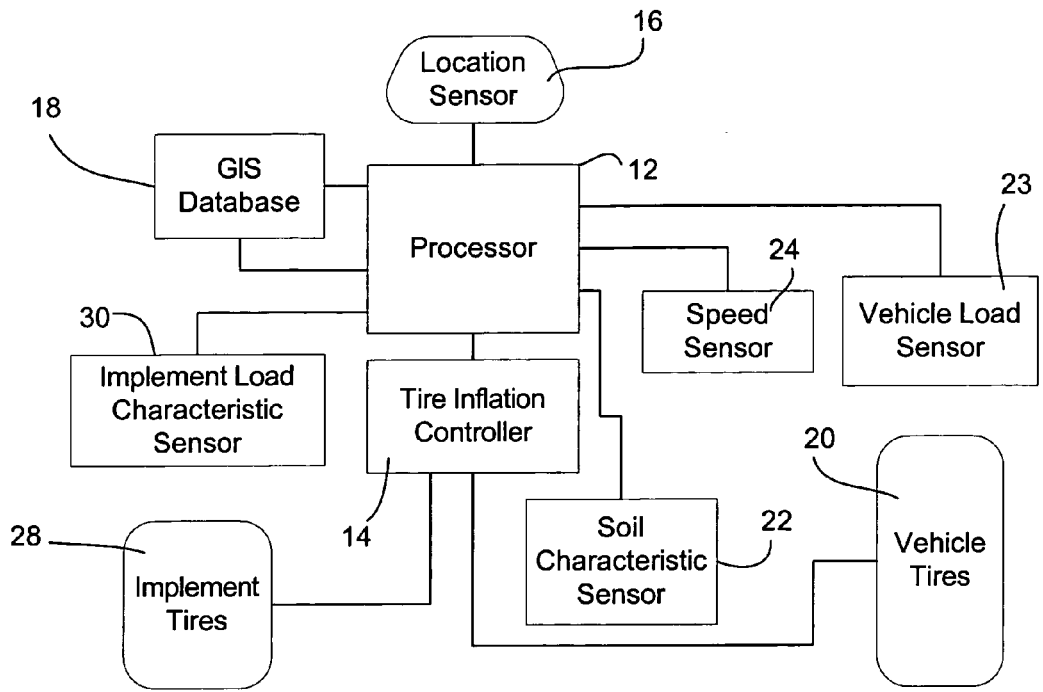
FIG. 2 is a block diagram illustrating a central tire inflation system for an agricultural implement.

Referring to FIG. 2, processor 12 is connected to and able to communicate with tire inflation controller 14, location sensor 16, database 18, soil characteristic sensor 22, speed sensor 24, vehicle load characteristic sensor 23 and implement load characteristic sensor 30. The tire inflation controller 14 controls a compressor (not illustrated) and a valve (not illustrated) for increasing tire pressure and letting air out of the implement tires to deflate the tires, respectively. In at least some embodiments the controller 14 is also linked to the vehicle tires for controlling pressure therein. The compressor/valve link between controller 14 and the tires is shown in FIG. 2 by a line linking the controller 28 to the tires 28 and 20.

Figure 3:
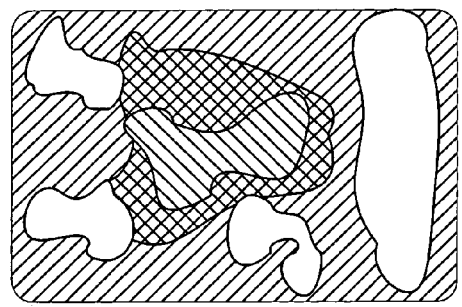
FIG. 3 is field moisture map with soil moisture key.

Database 18 can contain one or more types of soil characteristic data for a field through which an implement is to be moved. For example, database 18 may contain data about the soil type, soil particle size, soil compaction, wetness or moisture level in the soil, soil makeup, and the like. Referring to FIG. 3, an exemplary field soil moisture map is illustrated that indicates separate zones within a field that have different moisture characteristics. A soil moisture key is provided below the map that indicates relative wetness characteristics. Thus, in the left to right down cross hatch areas there is relatively more moisture than in the other areas on the map. Here, optimal tire pressure is assumed to be related to moisture characteristics within the field.

In at least some inventive embodiments, during operation, processor 12 either determines implement location using information from sensor 18 or receives location signals from sensor 16 and accesses database 18 to determine soil condition and then uses soil condition and perhaps other information to identify an optimal tire pressure level.

In at least some cases soil condition will have already been used to identify control signals for the implement and the control signals will have been stored in the database for subsequent use. Thus, for instance, for a specific implement, optimal tire pressure values may already have been determined for specific soil moisture conditions and the database may simply correlate optimal tire pressure values with field locations as opposed to correlating locations with soil characteristics.

Figure 4:
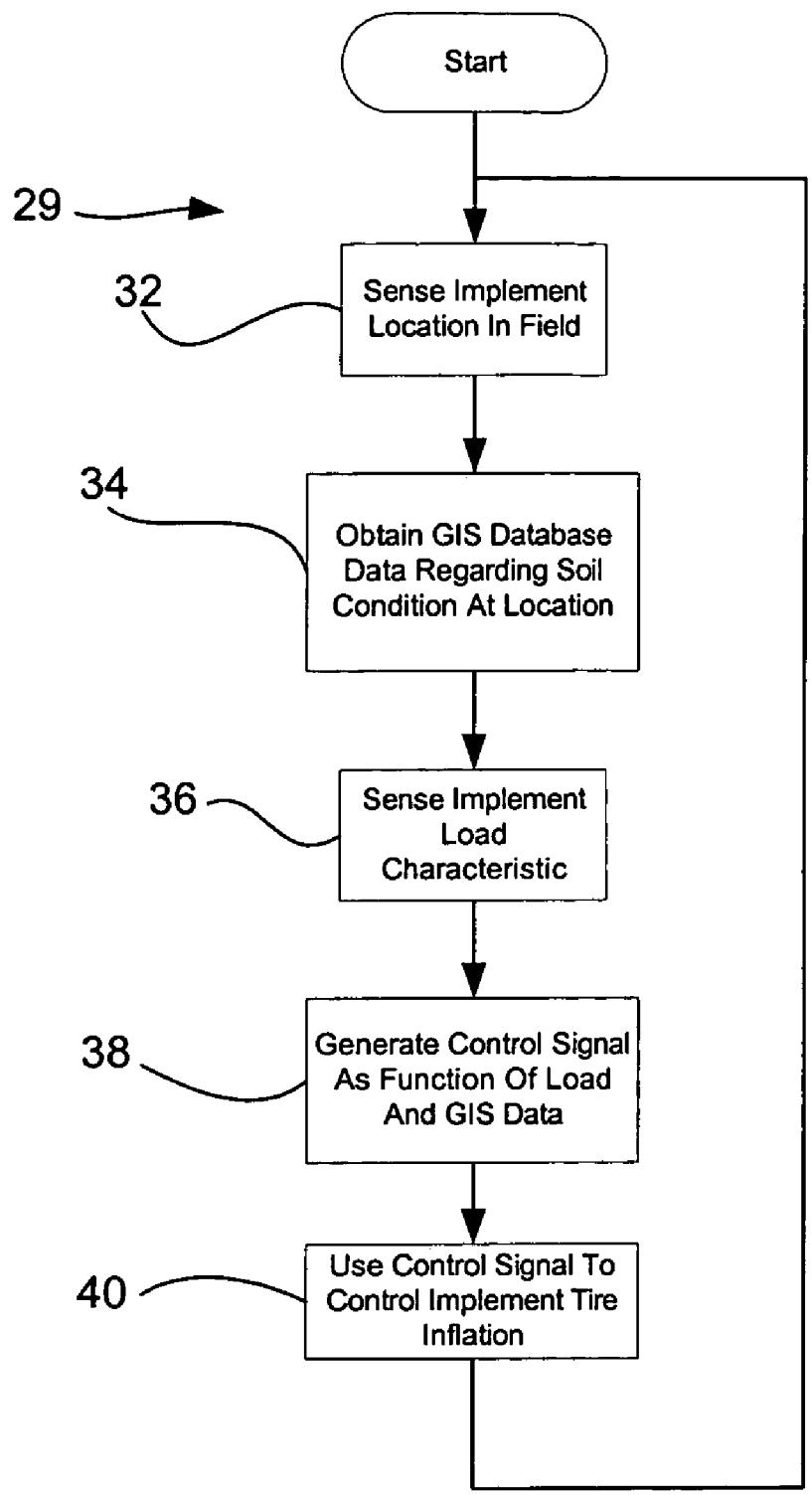
FIG. 4. is a flow chart illustrating a method of operating a central tire inflation system for agricultural implement.

Referring to FIG. 4, a flow diagram 29 illustrates a first inventive tire inflation method. Steps include sensing implement location within a field (step 32), reading data from database 18 corresponding to a field through which the implement is being moved by a prime mover (step 34), sensing a load characteristic of the implement (step 36), generating a tire inflation control signal based on the load characteristic value and database data (step 38) and sending the control signal to the tire inflation controller thereby causing the controller to inflate or deflate the tires as appropriate (step 40). Thus, in this case, known field conditions are used along with real time implement tire load to identify optimal tire pressure.

As shown in FIGS. 1 and 2, the agricultural implement load characteristic sensor 30 provides the processor 12 with information about a load on the agricultural implement. In many agricultural applications, implement load changes throughout operation. Here, a sensor periodically or constantly monitors load and the processor controls inflation based on the changing load. The type of load characteristic sensor needed depends on agricultural implement type. For example, the agricultural implement load characteristic sensor 30 can be a load cell on at least one tire supporting axle. As another example, the sensor 30 may include one or more load cells under a product collection bin. As another example, sensor 30 may be a bale volume sensor, a bulk fill sensor, a sprayer level sensor, a pneumatic down pressure sensor, or any other sensor that could provide information about tire load and the like. In some cases the sensor 30 may measure hydraulic pressure in a hydraulic cylinder that is linked to a gauge wheel or a carrying wheel on the implement. In another embodiment of the central tire inflation system, there can be more than one type of sensor providing information about the load or other factors relating to inflation of the tires.

Referring again to FIGS. 1 and 2, location sensor 16 may take any of several different forms. For instance, in one particularly advantageous embodiment sensor 16 may be a GPS device that transmits beacon signals to satellites or the like in the sky and that that receives location information back from the satellites regarding the location of the implement. Here, a satellite based processor or some other remotely located processor may also process the information received from the implement or vehicle mounted device to determine implement location and then transmit the location information back to the implement.

In other cases sensor 16 may be a GPS receiver for receiving signals from satellites and may include software for independently determining the location of the implement using the received signals. Hereinafter, unless indicated otherwise, the term "receiver" will be used to refer to the GPS component that resides on the prime mover or on the implement that corresponds to either type of GPS system (i.e., system including remote or implement/vehicle mounted processors to determine location) in the interest of simplifying this explanation. Other location determining or sensing devices/systems are contemplated including dead reckoning systems, tag based proximity sensing systems, radar systems, and the like.

Figure 5:
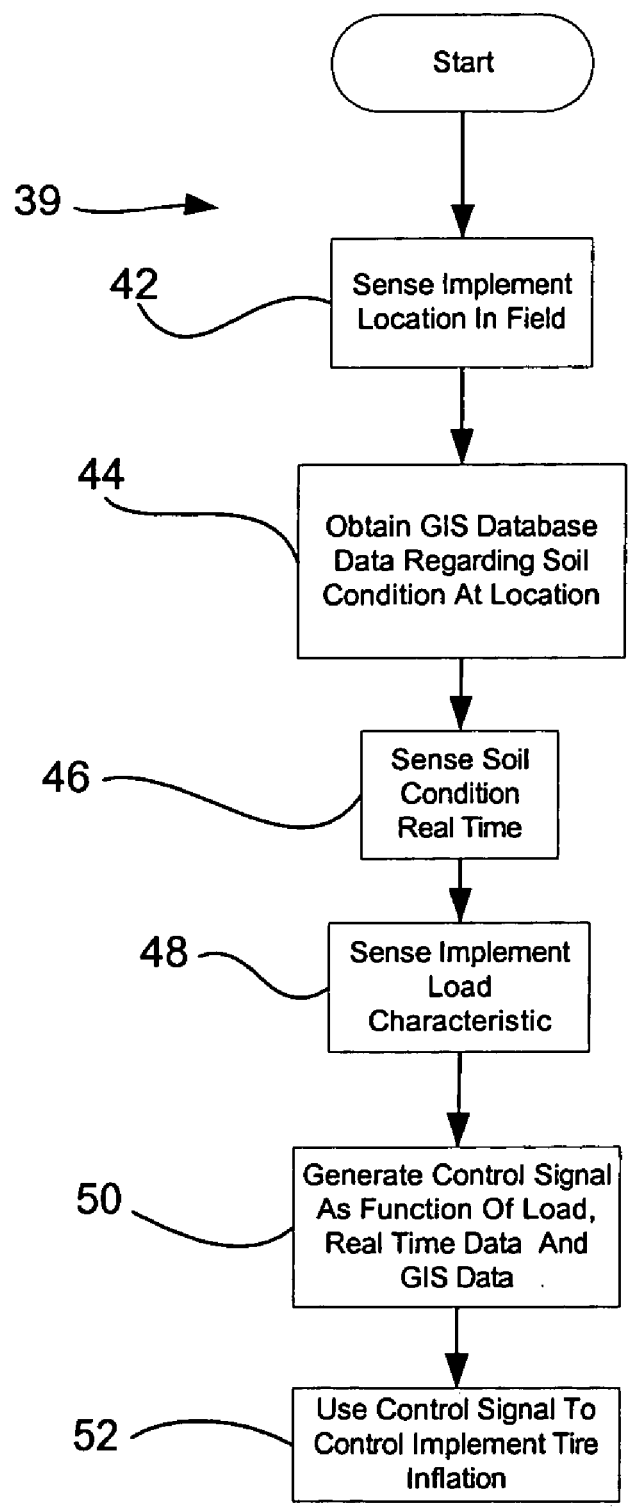
FIG. 5. is a flow chart illustrating another embodiment of a method of operating a central tire inflation system for an agricultural implement.

In some embodiments, in addition to accounting for pre-determined and pre-stored field conditions as well as real time implement tire load, a system will be equipped to also account for real time field measured soil conditions when identifying an optimal tire pressure level. To this end, referring to FIG. 5, a method 39 is illustrated that accounts for predetermined and pre-stored database identified soil conditions, real time soil conditions and at least a first implement tire load characteristic. Steps include sensing implement location within a field (step 42), reading data from the field database (step 44) including pre-stored soil characteristics associated with the implement location, sensing a real time characteristic of the soil (step 46), sensing a load on the agricultural implement (step 48), generating a tire inflation control signal based on the load value, database data and real time soil data (step 50), sending the control signal to the tire inflation controller and using the control signal to regulate implement tire pressure (step 52). Here, many different systems and processes are known or are currently being explored for sensing or estimating soil conditions in real time including sampling processes, processes of monitoring effects on soil that occur when an implement interacts therewith, processes where light or other wavelength rays are bounced off the soil and sensed, electromagnetic systems for measuring conductivity of soil, air flow type sensor systems, acoustic sensor systems, and the like. Here, the invention should not be limited by the type of real time soil condition determining process or system and all systems and processes are contemplated.

In at least some embodiments, optimal pressure may be determined in part by sensing ground speed of an implement and identifying tire pressure as a function of speed, field location and real time implement tire load. To this end, in at least some cases implement tire pressure should be increased as implement speed is increased. An accelerometer may also be used to generate additional information useable to identify a most suitable tire pressure level.

In some cases the central tire inflation system will control the inflation of multiple towed implements (e.g., an air seeder followed be a seed cart or an anhydrous applicator followed by an anhydrous tank). In these cases the pressure level of tires on the tillage tool may be determined as a function of the negative or positive forces the tillage tool places on the main frame while the inflation in the product cart may be determined by the amount of product being carried, the tire load level, etc.

In at least some cases a single processor based controller 14 may be programmed to receive load characteristic values from each of vehicle tires 20 (e.g., from sensor 23) as well as implement tires 28 and may use that information to control the vehicle and implement tires differently. To this end, as indicated above, in many cases, as load is increased, tire pressure has to be increased to maintain suitable operation of the tire while, in the case of an implement where ground engaging components cause downward suck, tire pressure should be decreased to avoid bull dozing of the tires through the soil. Thus, in this case, when load on the vehicle tires increases, the controller may be programmed to increase tire pressure and, in the case of the implement, as load on the tires increases, controller 14 may decrease implement tire pressure to facilitate optimal performance.

The invention is to cover all modifications, equivalents, and alternatives falling within the spirit and scope of the invention as defined by the following appended claims. To apprise the public of the scope of this invention, the following claims are made:

I claim:

1. A tire inflation system for an agricultural implement or implements supported by inflatable tires and attached to a vehicle for movement, the system comprising:
    at least a first sensor supported by the agricultural implement to sense at least a first implement load characteristic and to generate at least a first load signal;
    a processor receiving the first load signal and generating tire inflation control signals as a function of at least the first load signal;
    a tire inflation controller receiving the inflation control signal and regulating the implement tire pressure as a function of the inflation control signals wherein the control signals tend to decrease the tire pressure as the magnitude of the load signal increases; and
    a soil characteristic determiner that generates soil characteristic signals as the implement is moved through a field, the soil characteristic signals indicating at least one soil condition proximate the implement, the processor generating tire inflation control signals as a function of at least the first load signal and the soil characteristic signals;
    wherein the soil characteristic determiner includes at least one of a soil moisture sensor, a soil bulk density sensor, a compaction layer sensor, a soil conductivity sensor, a soil profile sensor and an inclinometer.

2. A tire inflation system for an agricultural implement or implements supported by inflatable tires and attached to a vehicle for movement, the system comprising:
    at least a first sensor supported by the agricultural implement to sense at least a first implement load characteristic and to generate at least a first load signal;
    a processor receiving the first load signal and generating tire inflation control signals as a function of at least the first load signal;
    a tire inflation controller receiving the inflation control signal and regulating the implement tire pressure as a function of the inflation control signals wherein the control signals tend to decrease the tire pressure as the magnitude of the load signal increases; and
    a soil characteristic determiner that generates soil characteristic signals as the implement is moved through a field, the soil characteristic signals indicating at least one soil condition proximate the implement, the processor generating tire inflation control signals as a function of at least the first load signal and the soil characteristic signals;
    wherein the soil characteristic determiner includes a database and a location determiner, the database storing condition characteristics corresponding to a field in which the implement is to be used, the characteristics correlating at least the one condition with field locations, the location determiner for determining the location of the implement within the field during operation, the processor using the implement location and the database to identify the soil characteristics proximate the implement.

3. The system of claim 2 wherein the implement includes at least one axle to which at least one of the implement tires is mounted, the sensor including at least one of a load cell on the axle, at least one load cell on an implement product bin, a bale volume sensor, a bulk fill sensor, a sprayer level sensor and down pressure sensor.

4. The apparatus of claim 2 wherein the implement includes a ground engaging component that increases the load on the implement tires when the component engages the ground.

5. The system of claim 2 wherein the implement includes at least one carrying wheel coupled to a hydraulic cylinder and the sensor is a hydraulic pressure sensor sensing the hydraulic pressure of the hydraulic cylinder.

6. The system of claim 2 wherein the implement includes at least one gauge wheel coupled to a hydraulic cylinder and wherein the sensor is a hydraulic pressure sensor sensing the hydraulic pressure of the hydraulic cylinder.

7. The apparatus of claim 2 wherein the location determiner includes a GPS receive.

8. The system of claim 2 wherein the vehicle is also supported by inflatable vehicle tires and wherein the system is also for regulating the vehicle tire pressure, the system further including a vehicle load determiner for identifying at least one vehicle load characteristic and generating a vehicle load signal, wherein the processor also receives a vehicle load signal and generates a vehicle tire inflation control signals as a function of the vehicle load signal.

9. The system of claim 8 wherein the vehicle tire inflation control signals tend to increase the tire pressure as the magnitude of the vehicle load signal increases.

10. The system of claim 8 wherein the processor is supported by the vehicle.

11. A central tire inflation system for an agricultural implement that is linked to a work vehicle for movement through a field where the implement is supported by inflatable tires, the system for regulating implement tire pressure, the system comprising:
    a predefined and pre-stored database storing soil condition characteristics corresponding to locations within a field in which the implement is to be used wherein the database indicates at least first and second different soil conditions corresponding to first and second different locations within the field;
    at least a first load sensor mounted to the implement for sensing at least a first load characteristic associated with the implement and generating a first load characteristic signal;
    a location determiner for determining the location of the implement in the field as the implement is moved through the field and for generating location signals;
    a processor receiving the location signals and identifying soil conditions proximate the implement by accessing the database, the processor also receiving the first load characteristic signal and generating inflation control signals as a function of the soil conditions proximate the implement and the first load condition signal; and
    a tire inflation controller receiving the inflation control signals and regulating the implement tire pressure as a function of the inflation control signals.

12. The system of claim 11 wherein the implement includes at least one axle to which at least one of the implement tires is mounted, the sensor including at least one of a load cell on the axle, at least one load cell on an implement product bin, a bale volume sensor, a bulk fill sensor, a sprayer tank level sensor and a down pressure sensor.

13. The apparatus of claim 11 wherein the implement includes a ground engaging component that increases the load on the implement tires when the component engages the ground and wherein the processor generates control signals that tend to increase or decrease tire pressure as the magnitude of the load signal is increased.

14. The system of claim 11 wherein the at least one soil characteristic includes at least one of a soil moisture level, a soil bulk density level, a soil compaction level, a soil conductivity level, a soil profile and a grade inclination.

15. The system of claim 11 wherein the location determiner includes a GPS receiver.

16. A method for regulating pressure in tires of an implement that is attached to a vehicle for movement, the method comprising the steps of:
sensing at least a first implement load characteristic;
providing a predefined and pre-stored database storing soil condition characteristics corresponding to locations within a field in which the implement is to be used wherein the database indicates at least first and second different soil conditions corresponding to first and second different locations within the field;
receiving global positioning data and using the data to identify the location of the implement within a field;
using the location information and the database to determine soil condition proximate the implement; and
generating tire inflation control signals as a function of both the soil condition proximate the implement and the at least a first load characteristic, wherein the control signals tend to decrease the tire pressure as the magnitude of the load characteristic increases.

17. The method of claim 16 wherein the implement includes at least one wheel coupled to a hydraulic cylinder and wherein the step of sensing at least one load characteristic includes sensing the hydraulic pressure of the hydraulic cylinder.

18. A method for use with an agricultural implement that is linked to a work vehicle for movement through a field where the implement is supported by inflatable tires, the method for regulating implement tire pressure, the method comprising the steps of:
providing a predefined and pre-stored database storing soil condition characteristics corresponding to locations within a field in which the implement is to be used wherein the database indicates at least first and second different soil conditions corresponding to first and second different locations within the field;
sensing at least a first load characteristic associated with the implement and generating a first load characteristic signal;
determining the location of the implement in the field as the implement is moved through the field;
identifying soil conditions proximate the implement by accessing the database and identifying the conditions associated with the determined location;
generating inflation control signals as a function of the soil conditions proximate the implement and the first load condition signal; and
regulating the implement tire pressure as a function of the inflation control signals.

19. The method of claim 18 wherein the implement includes at least one axle to which at least one of the implement tires is mounted, the sensor including at least one of a load cell on the axle, at least one load cell on an implement product bin, a bale volume sensor, a bulk fill sensor, a sprayer level sensor, down pressure sensor and a hydraulic fluid level sensor.

20. The method of claim 18 wherein the step of determining the location includes using a GPS system to determine the location.

* * * * *